US012307577B2

(12) United States Patent
Pankratz et al.

(10) Patent No.: US 12,307,577 B2
(45) Date of Patent: May 20, 2025

(54) TRAVERSING MULTIPLE REGIONS OF A BOUNDING VOLUME HIERARCHY IN PARALLEL

(71) Applicants: Advanced Micro Devices, Inc., Santa Clara, CA (US); ATI Technologies ULC, Markham (CA)

(72) Inventors: David William John Pankratz, Markham (CA); Daniel James Skinner, Milton Keynes (GB); Michael John Livesley, Milton Keynes (GB)

(73) Assignees: Advanced Micro Devices, Inc., Santa Clara, CA (US); ATI Technologies ULC, Ontario (CA)

( * ) Notice: Subject to any disclaimer, the term of this patent is extended or adjusted under 35 U.S.C. 154(b) by 143 days.

(21) Appl. No.: 18/089,442

(22) Filed: Dec. 27, 2022

(65) Prior Publication Data

US 2024/0212259 A1 Jun. 27, 2024

(51) Int. Cl.
*G06T 15/06* (2011.01)

(52) U.S. Cl.
CPC .......... *G06T 15/06* (2013.01); *G06T 2210/21* (2013.01); *G06T 2210/52* (2013.01)

(58) Field of Classification Search
CPC .. G06T 15/06; G06T 2210/21; G06T 2210/52
See application file for complete search history.

(56) References Cited

U.S. PATENT DOCUMENTS

| 2014/0168238 | A1* | 6/2014 | Luebke ............... G06T 15/06 345/522 |
| 2019/0057539 | A1* | 2/2019 | Stanard ............... B29C 63/36 |
| 2019/0156550 | A1* | 5/2019 | Stanard ............... G06T 15/06 |
| 2019/0355166 | A1* | 11/2019 | Clark ............... G06T 17/005 |
| 2021/0407177 | A1* | 12/2021 | Janus ............... G06T 15/005 |
| 2022/0036639 | A1* | 2/2022 | Rabbani Rankouhi ............ G06T 15/06 |
| 2022/0036652 | A1* | 2/2022 | Rabbani Rankouhi ............ G06F 30/31 |
| 2022/0066819 | A1* | 3/2022 | Nowicki ............... G06F 9/3802 |
| 2023/0394739 | A1* | 12/2023 | Usher ............... G06T 15/503 |

(Continued)

OTHER PUBLICATIONS

Chitalu, F., et.al., "Bulk-Synchronous Parallel Simultaneous BVH Traversal for Collision Detection on GPUs", I3D 18 Proceedings of the ACM SIGGRAPH Simposium on Interactive 3D Graphics and Games, 2018, 10pgs (Year: 2018).*

(Continued)

*Primary Examiner* — Michael Le
(74) *Attorney, Agent, or Firm* — Volpe Koenig

(57) ABSTRACT

An implementation comprises traversing a bounding volume hierarchy for each ray of a plurality of rays concurrently using a plurality of execution items. In response to determining that a first execution item of the plurality of execution items is finished traversing the bounding volume hierarchy for a first ray of the plurality rays, the embodiment causes the first execution item to traverse the bounding volume hierarchy for a second ray of the plurality of rays while a second execution item of the plurality of execution items traverses the bounding volume hierarchy for the second ray. And the embodiment comprises initiating side-effects with the first and second execution items in an order indicated by the bounding volume hierarchy.

20 Claims, 12 Drawing Sheets

(56) References Cited

U.S. PATENT DOCUMENTS

2024/0233238 A1* 7/2024 Liktor .................. G06T 15/005

OTHER PUBLICATIONS

Chitalu, F., et. al., "Bulk-Synchronous Parallel Simultaneous BVH Traversal for Collision Detection on GPUs", I3D 18 Proceedings of the ACM SIGGRAPH Simposium on Interactive 3D Graphics and Games, 2018, 10 pgs.

* cited by examiner

TRAVERSING MULTIPLE REGIONS OF A BOUNDING VOLUME HIERARCHY IN PARALLEL

BACKGROUND

Ray tracing is a type of graphics-rendering technique in which simulated rays of light are cast to test for object intersection and pixels are colored based on the result of the ray cast. Ray tracing is computationally more expensive than rasterization-based techniques but produces more physically accurate results. Improvements in ray tracing operations are constantly being made.

BRIEF DESCRIPTION OF THE DRAWINGS

A more detailed understanding may be had from the following description, given by way of example in conjunction with the accompanying drawings wherein.

DETAILED DESCRIPTION

A technique is provided for traversing a bounding volume hierarchy for a ray concurrently using a plurality of execution items. The technique includes, in response to determining that a first execution item is finished traversing the bounding volume hierarchy for a first ray, causing the first execution item to traverse the bounding volume hierarchy for a second ray while a second execution item also traverses the bounding volume hierarchy for the second ray. The technique further includes initiating side-effects with the first and second execution items in an order indicated by the bounding volume hierarchy.

Figure 1:
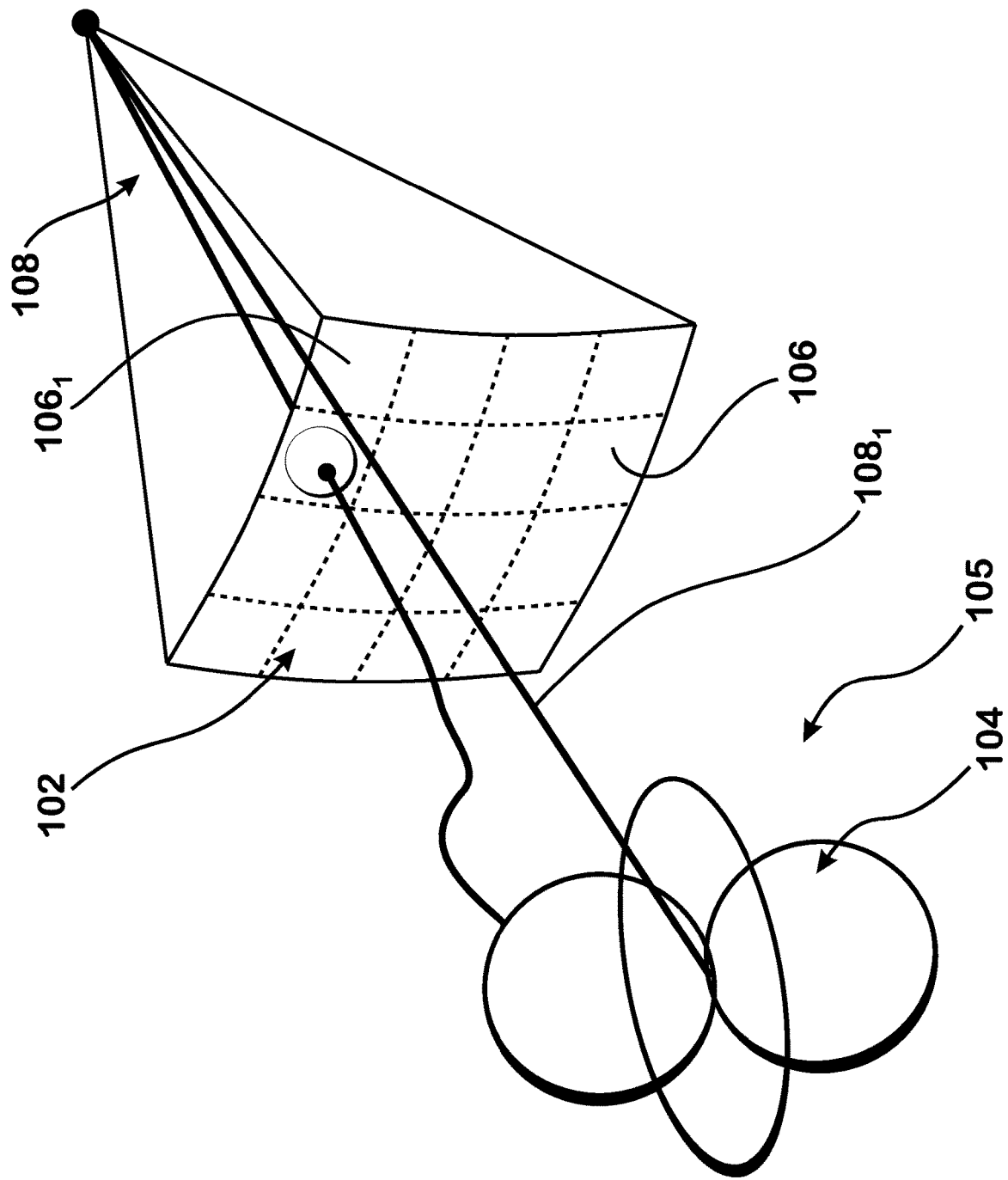
FIG. 1 illustrates generating an image for a scene using ray tracing.

FIG. 1 illustrates a technique for generating a two-dimensional image 102 of a scene 104 using ray tracing, according to an example. The image 102 includes a plurality of pixels 106. The image 102 can be displayed on a display or can be used for another purpose such as for further image processing. The scene 104 is a three-dimensional space including one or more objects 105. Rays 108 determine the color, brightness, and other parameters of the pixels 106 that the rays intersect. Briefly, such rays are tested for intersection with the objects 105 and the pixels 106 that the rays pass through are colored based on colors associated with such objects 105. Additional details are provided below.

An object 105 in the scene 104 is represented by a collection of primitives, which are portions of the object 105 that together comprise the object 105. Primitives are often triangles but can be procedurally defined or can have another shape. Pixels are colored using shaders such as any hit shaders, closest hit shaders, or other shader types as described elsewhere herein. Such shaders may perform any technically feasible operation to color pixels, and typically use textures, lighting effects, and other effects. The manner in which a pixel 106 is colored by a ray depends on the ray that intersects the pixel 106 and the geometry (e.g., primitive) that the ray intersects. Specifically, when a ray that intersects a pixel 106 is determined to intersect a primitive, the pixel is colored based on the intersected primitive, and possibly using other operations.

In some applications, the scene 104 changes over time, for example, when objects within the scene move relative to each other or relative to the display 100. For example, a scene in a video game may change over time. Consequently, rays are periodically cast into a scene in order to generate a series of images 102 that appears as an animation.

As discussed below, the processor traverses the bounding volume hierarchy for each of the many rays 108 in parallel, but if the processor finishes traversing the bounding volume hierarchy for a first ray before finishing traversing the bounding volume hierarchy for one or more remaining rays, then the portion of the processor that is finished traversing the bounding volume hierarchy for the first ray remains idle until the processor finishes traversing the bounding volume hierarchy for the remaining rays.

Discussed below is a technique for utilizing the portion of the processor that would otherwise remain idle to assist with traversing the bounding volume for the one or more remaining rays. Such a technique can improve performance for ray tracing.

Figure 2:
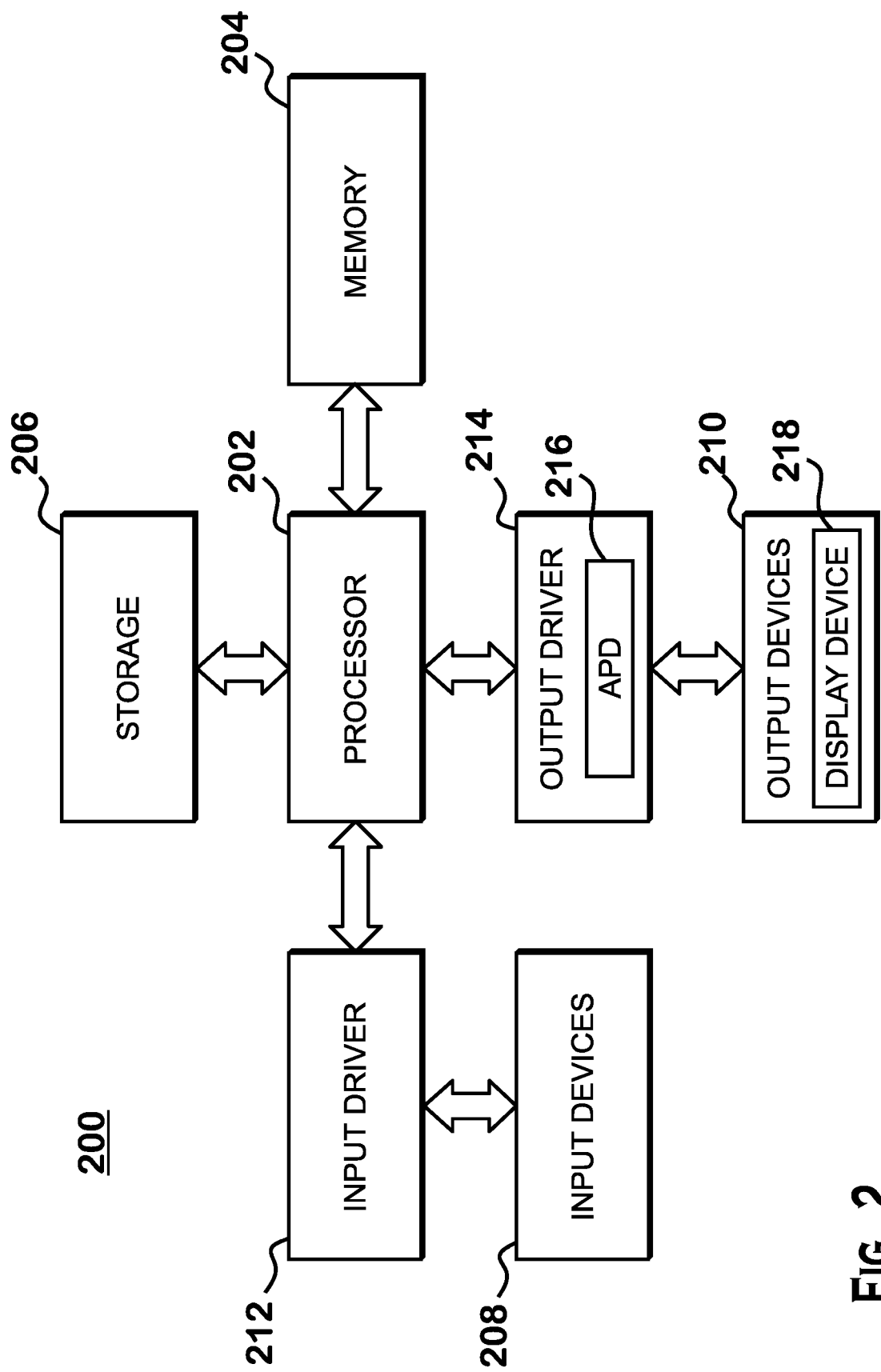
FIG. 2 is a block diagram of an example device in which one or more features of the disclosure can be implemented.

FIG. 2 is a block diagram of an example device 200 in which one or more features of the disclosure can be implemented. The device 200 includes, for example, a computer, a gaming device, a handheld device, a set-top box, a television, a mobile phone, or a tablet computer. The device 200 includes a processor 202, a memory 204, a storage 206, one or more input devices 208, and one or more output devices 210. The device 200 also optionally includes an input driver 212 and an output driver 214. It is understood that the device 200 includes additional components not shown in FIG. 2.

In various alternatives, the processor 202 includes a central processing unit (CPU), a graphics processing unit (GPU), a CPU and GPU located on the same die, or one or more processor cores, wherein each processor core can be a CPU or a GPU. In various alternatives, the memory 204 is located on the same die as the processor 202, or is located separately from the processor 202. The memory 204 includes a volatile or non-volatile memory, for example, random-access memory (RAM), dynamic RAM, or a cache.

The storage 206 includes a fixed or removable storage, for example, a hard-disk drive, a solid-state drive, an optical disk, or a flash drive. The input devices 208 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 210 include, without limitation, a display device 218, a speaker, a printer, a haptic feedback device, one or more lights, an antenna, or a network connection (e.g., a wireless local area network card for transmission and/or reception of wireless IEEE 802 signals).

The input driver 212 communicates with the processor 202 and the input devices 208 and permits the processor 202 to receive input from the input devices 208. The output driver 214 communicates with the processor 202 and the output devices 210 and permits the processor 202 to send output to the output devices 210. It is noted that the input driver 212 and the output driver 214 are optional components, and that the device 200 operates in the same manner if the input driver 212 and the output driver 214 are not present. The output driver 214 includes an accelerated processing device ("APD") 216 which is coupled to a display device 218. The APD 216 is configured to accept compute commands and graphics rendering commands from processor 202, to process those compute and graphics rendering commands, and to provide pixel output to display device 218 for display. As described in further detail below, the APD 216 includes one or more parallel processing units configured to perform computations in accordance with a single-instruction-multiple-data ("SIMD") paradigm. Thus, although various functionality is described herein as being performed by or in conjunction with the APD 216, in various alternatives, the functionality described as being performed by the APD 216 is additionally or alternatively performed by other computing devices having similar capabilities that are not driven by a host processor (e.g., processor 202) and configured to provide (graphical) output to a display device 218. For example, it is contemplated that any processing system that performs processing tasks in accordance with a SIMD paradigm can be configured to perform the functionality described herein. Alternatively, it is contemplated that computing systems that do not perform processing tasks in accordance with a SIMD paradigm performs the functionality described herein.

Figure 3:
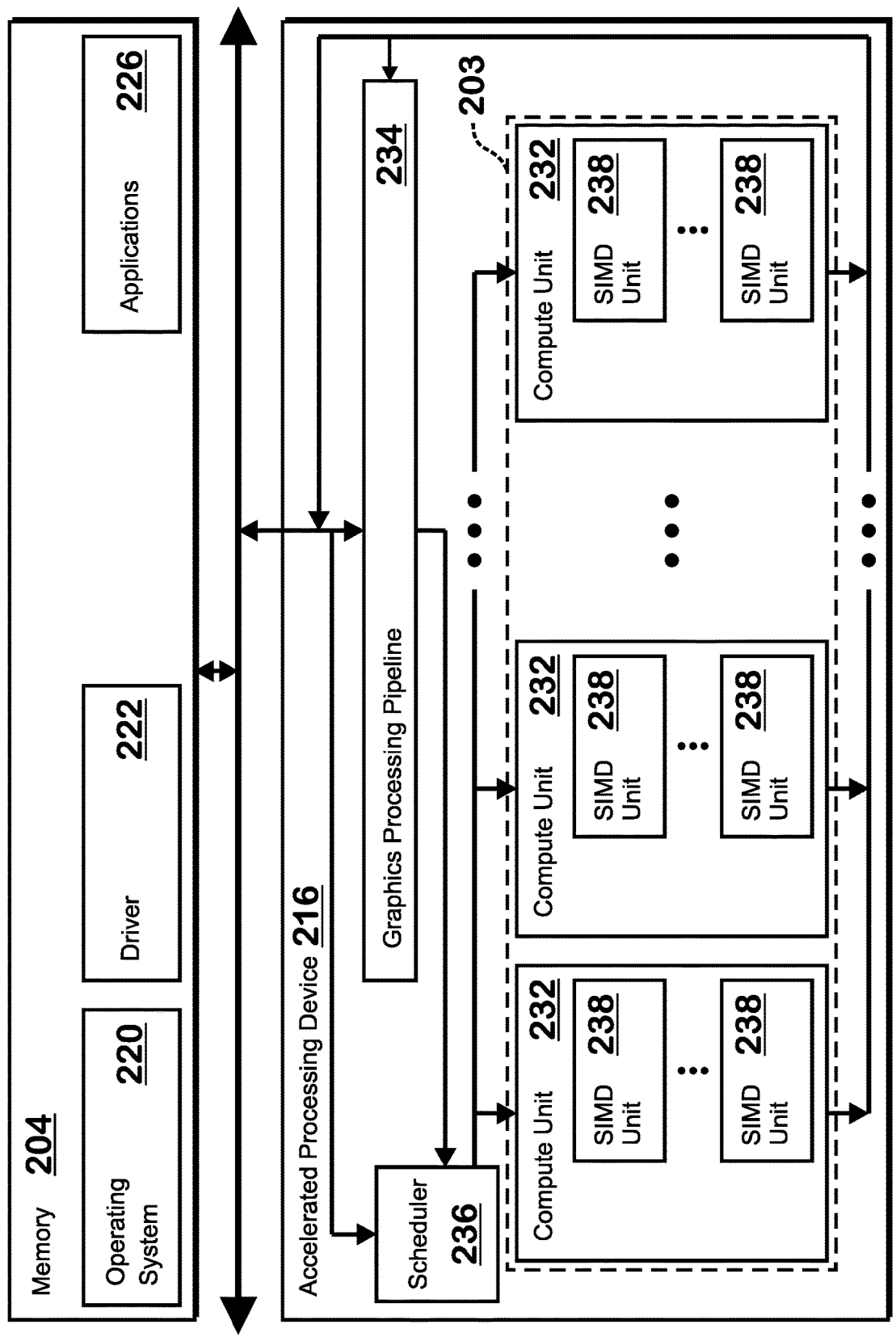
FIG. 3 is a block diagram of the device, illustrating additional details related to execution of processing tasks on the accelerated processing device of FIG. 2, according to an example.

FIG. 3 is a block diagram of a portion of the device 200 of FIG. 2, illustrating additional details related to execution of processing tasks on the APD 216. The processor 202 maintains, in system memory 204, one or more control logic modules for execution by the processor 202. The control logic modules include an operating system 220, a driver 222, and applications 226. These control logic modules control various features of the operation of the processor 202 and the APD 216. For example, the operating system 220 directly communicates with hardware and provides an interface to the hardware for other software executing on the processor 202. The driver 222 controls operation of the APD 216 by, for example, providing an application programming interface ("API") to software (e.g., applications 226) executing on the processor 202 to access various functionality of the APD 216. In some implementations, the driver 222 includes a just-in-time compiler that compiles programs for execution by processing components (such as the SIMD units 238 discussed in further detail below) of the APD 216. In other implementations, no just-in-time compiler is used to compile the programs, and a normal application compiler compiles shader programs for execution on the APD 216.

The APD 216 executes commands and programs for selected functions, such as graphics operations and non-graphics operations that are suited for parallel processing and/or non-ordered processing. The APD 216 is used for executing graphics pipeline operations such as pixel operations, geometric computations, and rendering an image to display device 218 based on commands received from the processor 202. The APD 216 also executes compute processing operations that are not directly related to graphics operations, such as operations related to video, physics simulations, computational fluid dynamics, or other tasks, based on commands received from the processor 202.

The APD 216 includes compute units 232 (together "parallel processing units 203) that include one or more SIMD units 238 that perform operations at the request of the processor 202 in a parallel manner according to a SIMD paradigm. The SIMD paradigm is one in which multiple processing elements share a single program control flow unit and program counter and thus execute the same program but can execute that program with different data. In one example, each SIMD unit 238 includes sixteen lanes, where each lane executes the same instruction at the same time as the other lanes in the SIMD unit 238 but executes that instruction with different data. Lanes can be switched off with predication if not all lanes are to execute a given instruction. Predication can be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow. In an implementation, each of the compute units 232 can have a local L1 cache. In an implementation, multiple compute units 232 share an L2 cache.

The basic unit of execution in compute units 232 is a work-item. Each work-item represents a single instantiation of a program that is to be executed in parallel in a particular lane. Work-items can be executed simultaneously as a "wavefront" on a single SIMD processing unit 238. One or more wavefronts are included in a "work group," which includes a collection of work-items designated to execute the same program. A work group is executed by executing each of the wavefronts that make up the work group. In alternatives, the wavefronts are executed sequentially on a single SIMD unit 238 or partially or fully in parallel on different SIMD units 238. Wavefronts can be thought of as a collection of work-items that can be executed simultaneously on a single SIMD unit 238, although it is possible for wavefronts to be divided into sets of work-items, each of which is executed simultaneously on a single SIMD unit 238. A scheduler 236 is configured to perform operations related to scheduling various wavefronts on different compute units 232 and SIMD units 238.

The parallelism afforded by the compute units 232 is suitable for graphics-related operations such as pixel-value calculations, vertex transformations, ray-tracing operations, and other graphics operations. Thus, in some instances, a graphics pipeline 234, which accepts graphics processing commands from the processor 202, provides computation tasks to the compute units 232 for execution in parallel.

The compute units 232 are also used to perform computation tasks not related to graphics or not performed as part of the "normal" operation of a graphics pipeline 234 (e.g., custom operations performed to supplement processing performed for operation of the graphics pipeline 234). An application 226 or other software executing on the processor 202 transmits programs that define such computation tasks to the APD 216 for execution.

The compute units 232 implement ray tracing, which is a technique that renders a 3D scene by testing for intersection between simulated light rays and objects in a scene (such as the scene 104 of FIG. 1). Much of the work involved in ray tracing is performed by programmable shader programs, executed on the SIMD units 238 in the compute units 232, as described in additional detail below.

Figure 4:
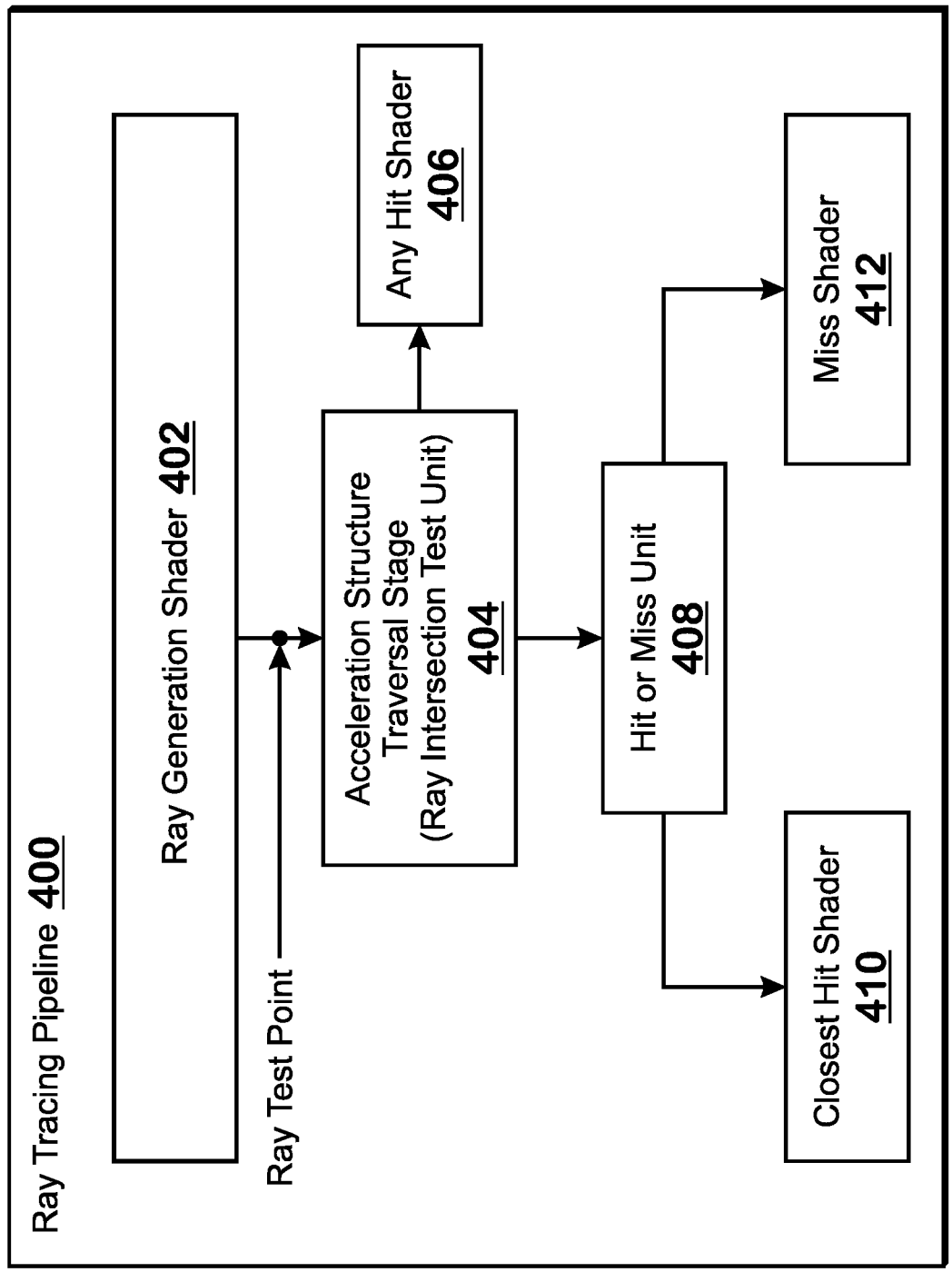
FIG. 4 illustrates a ray-tracing pipeline for rendering graphics using a ray-tracing technique, according to an example.

FIG. 4 illustrates a ray tracing pipeline 400 for rendering graphics using a ray-tracing technique, according to an example. The ray-tracing pipeline 400 provides an overview of operations and entities involved in rendering a scene (such as the scene 104 of FIG. 1) utilizing ray tracing. In some implementations, a ray generation shader 402, any hit shader 406, closest hit shader 410, and miss shader 412 are shader-implemented stages that represent ray-tracing pipeline stages whose functionality is performed by shader programs executing in the SIMD unit 238. Any of the specific shader programs at each particular shader-implemented stage are defined by application-provided code (i.e., by code provided by an application developer that is pre-compiled by an application compiler and/or compiled by the driver 222). In other implementations, any of the ray generation shader 402, any hit shader 406, closest-hit shader 410, and miss shader 412 are implemented as software executed on any type of processor and that performs the operations described herein, circuitry that performs the operations described herein, or a combination of hardware circuitry and software executing on a processor. The acceleration-structure traversal stage 404 performs a ray-intersection test to determine whether a ray hits a triangle.

The ray-tracing pipeline 400 indicates the path through which a ray-tracing operation flows. To render a scene using ray tracing, a rendering orchestrator, such as a program executing on the APD 116, designates a collection of geometry as a "scene" (such as the scene 104 of FIG. 1). Various objects in the scene are represented as collections of geometry primitives, which are often triangles, but could be any geometric shape. The term "triangle" when used herein, refers to these geometric primitives that compose a scene. The rendering orchestrator renders the scene by designating a camera position and an image (such as the image 102 of FIG. 1) and requesting rays be traced from the camera through the image. The ray-tracing pipeline 400 performs the various operations described herein to determine colors for the rays (such as the rays 108 of FIG. 1). The ray-tracing pipeline 400 designates colors for the pixels (such as the pixels 106 of FIG. 1) of the image, based on the results of ray-tracing operations for rays traced through the image. For example, a ray that hits a green triangle and passes through a particular screen position in the image can color the pixel corresponding to that screen position green.

Colors are often derived from the triangles that are intersected by the rays. As described elsewhere herein, a ray that hits no triangle invokes a miss shader 412. One possible operation for the miss shader 412 is to color the ray with a color from the "skybox," which is an image that is designated as representing the ambient scene where no geometry is present (for example, a scene with no geometry would render only the skybox). Colors for pixels in the image are determined based on the point of intersection between the ray and the image position. In some examples, after a sufficient number of rays are traced and the pixels of the image have been designated colors, the image is displayed on a screen (such as the display screen 218 of FIG. 2) or is used in some other manner.

In some implementations where the shader stages of the ray-tracing pipeline 400 are implemented in software, the various programmable shader stages (ray-generation shader 402, any hit shader 406, closest-hit shader 410, miss shader 412) are implemented as shader programs that execute on the SIMD units 238. The acceleration-structure-traversal stage 404 is implemented in software (e.g., as a shader program executing on the SIMD units 238), in hardware, or as a combination of hardware and software. The hit or miss unit 408 is implemented in any technically feasible manner, such as as part of any of the other units, implemented as a hardware accelerated circuit, or implemented as a shader program executing on the SIMD units 238. The ray-tracing pipeline 400 is, in various implementations, orchestrated partially or fully in software or partially or fully in hardware, and may be orchestrated by the processor 202, the scheduler 236, by a combination thereof, or partially or fully by any other hardware and/or software unit. In examples, traversal through the ray-tracing pipeline 400 is performed partially or fully by the scheduler 236, either autonomously or under control of the processor 202, or partially or fully by a shader program (such as a bounding-volume-hierarchy-traversal shader program) executing on one or more of the SIMD units 238. In some examples, testing a ray against boxes and triangles (inside the acceleration-structure-traversal stage 404) is hardware accelerated (meaning that a fixed-function hardware unit performs the steps for those tests). In other examples, such testing is performed by software such as a shader program executing on one or more SIMD units 238. Herein, where the phrase "the ray-tracing pipeline does [an action]" is used, this means that the hardware and/or software that implements the ray-tracing pipeline 400 does that action. Although described as executing on the SIMD unit 238 of FIG. 3, it is understood that in other implementations, other hardware, having or not having SIMD capabilities (e.g., the processor 202), alternatively executes the shader programs of the illustrated ray-tracing pipeline 400.

The ray-tracing pipeline 400 operates in the following manner. A ray-generation shader 402 is executed. The ray-generation shader 402 sets up data for a ray to test against triangles of a scene and requests the acceleration-structure-traversal stage 404 test the ray for intersection with triangles.

The acceleration-structure-traversal stage 404 traverses an acceleration structure, which is a data structure that describes a scene volume and objects (such as triangles) within the scene and tests the ray against triangles in the scene. In various examples, the acceleration structure is a bounding volume hierarchy. The hit-or-miss unit 408, which, in some implementations, is part of the acceleration-structure-traversal stage 404, determines whether the results of the acceleration-structure-traversal stage 404 (which may include raw data such as barycentric coordinates and a potential time to hit) actually indicates a hit. For triangles that are hit, the ray-tracing pipeline 400 triggers execution of the any-hit shader 406. Note that multiple triangles can be hit by a single ray. It is not guaranteed that the acceleration-structure-traversal stage will traverse the acceleration structure in the order from closest-to-ray-origin to farthest-from-ray-origin. The hit-or-miss unit 408 triggers execution of a closest-hit shader 410 for the triangle closest to the origin of the ray that the ray hits, or, if no triangles were hit, triggers a miss shader.

It is possible for the any-hit shader 406 to "reject" a hit from the ray-intersection test unit 404, and thus the hit-or-miss unit 408 triggers execution of the miss shader 412 if no hits are found or accepted by the ray-intersection test unit 404. An example circumstance in which an any hit shader 406 may "reject" a hit is when at least a portion of a triangle that the ray intersection test unit 404 reports as being hit is fully transparent. Because the ray-intersection test unit 404 only tests geometry, and not transparency, the any-hit shader 406 that is invoked due to a hit on a triangle having at least some transparency may determine that the reported hit is actually not a hit due to "hitting" on a transparent portion of the triangle. A typical use for the closest-hit shader 410 is to color a material based on a texture for the material. A typical use for the miss shader 412 is to color a pixel with a color set by a skybox. It is understood that the closest-hit shader 410 and miss shader 412 may implement a wide variety of techniques for coloring pixels and/or performing other operations. In instances in which these shaders are implemented as programmable shader stages executing shader programs, different shader programs used for the same application are capable of coloring pixels in different ways.

A typical way in which the ray-generation shader 402 generates rays is with a technique referred to as backwards ray tracing. In backwards ray tracing, the ray-generation shader 402 generates a ray (such as the ray 1081 of FIG. 1) having an origin at the point of the camera. The point at which the ray intersects a plane defined to correspond to the screen (the "image" above, such as the image 102 of FIG. 1) defines the pixel (such as the pixel 1061 of FIG. 1) whose color the ray is being used to determine. In some examples, if the ray hits an object, that pixel is colored based on the closest-hit shader 410. In some examples, if the ray does not hit an object, the pixel is colored based on the miss shader 412. In some example, more complicated combinations of shader executions are used to determine colors for pixels. Multiple rays may be cast per pixel, with the final color of the pixel being determined by some combination of the colors determined for each of the rays of the pixel. As described elsewhere herein, it is possible for individual rays to generate multiple samples, which each sample indicating whether the ray hits a triangle or does not hit a triangle. In an example, a ray is cast with four samples. Two such samples hit a triangle and two do not. The triangle color thus contributes only partially (for example, 50%) to the final color of the pixel, with the other portion of the color being determined based on the triangles hit by the other samples, or, if no triangles are hit, then by a miss shader. In some examples, rendering a scene involves casting at least one ray for each of a plurality of pixels of an image to obtain colors for each pixel. In some examples, multiple rays are cast for each pixel to obtain multiple colors per pixel for a multi-sample render target. In some such examples, at some later time, the multi-sample render target is compressed through color blending to obtain a single-sample image for display or further processing.

It is possible for any of the any-hit shader 406, closest-hit shader 410, and miss shader 412, to spawn their own rays, which enter the ray-tracing pipeline 400 at the ray test point. These rays can be used for any purpose. One common use is to implement environmental lighting or reflections. In an example, when a closest-hit shader 410 is invoked, the closest-hit shader 410 spawns rays in various directions. For each object, or a light, hit by the spawned rays, the closest-hit shader 410 adds the lighting intensity and color to the pixel corresponding to the closest-hit shader 410. It is understood that although some examples of ways in which the various components of the ray-tracing pipeline 400 can be used to render a scene have been described, any of a wide variety of techniques may alternatively be used.

Figure 5:
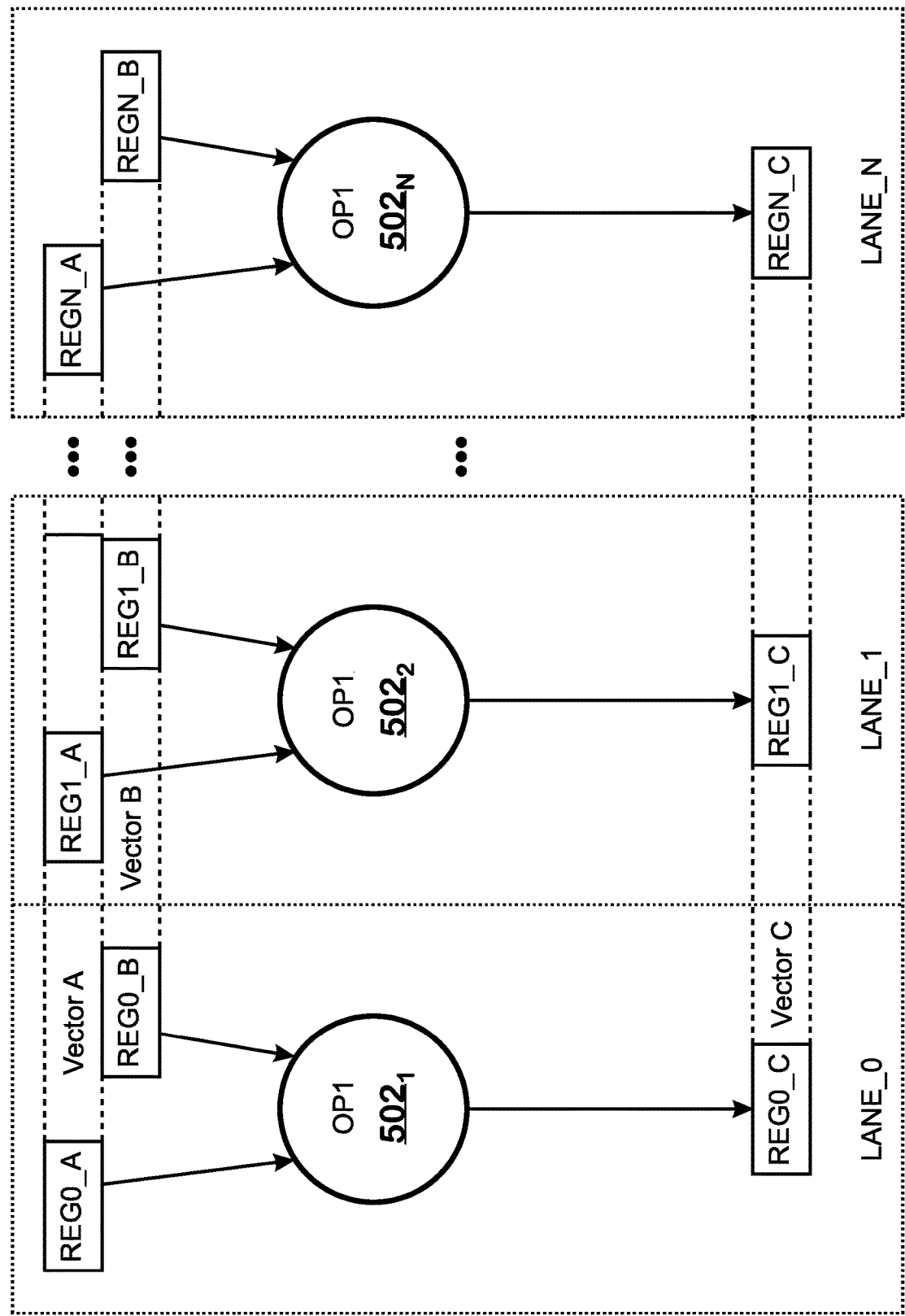
FIG. 5 illustrates parallel processing lanes of a SIMD unit 238, which can implement at least a part of the ray-tracing pipeline of FIG. 4, according to an example.

FIG. 5 is a diagram of a portion of a SIMD Unit 238 of FIG. 3 including lanes LANE_0-LANE_N, according to an example. The lanes LANE_0-LANE_N are lanes of a single SIMD unit 238. In the example of FIG. 5, the lanes LANE_0-LANE_N are lanes of a single SIMD unit having sixteen lanes. Each lane of a SIMD unit 238 performs the same instruction in parallel with the other lanes. In FIG. 5, this aspect is illustrated with a circle including the label "OP1" 502 for each of the illustrated lanes. Such instructions can be any type of instruction such as arithmetic logic unit ("ALU") operations (e.g., add, subtract, multiply), or memory instructions (e.g., store, load). Example source registers A and B and example destination register C are shown, but the lanes are capable of reading from and writing to any of a variety of registers, including those not shown.

In some examples or implementations, instructions that multiple lanes of a SIMD unit 238 are capable of performing in parallel include operations for traversing a BVH. Specifically, these operations include instructions for determining whether a ray intersects a node (e.g., a box node or triangle node) of the bounding volume hierarchy. In such examples, a shader causes a hardware intersection unit to execute the instruction, which identifies a ray and a node of a BVH, determines whether the ray intersects the node, and provides the result back to the shader. These instructions for determining whether a ray intersects a node of a BVH can be performed in parallel, meaning that multiple lanes of a SIMD unit 238 can request such tests to be performed and the results can be provided to such multiple lanes in parallel.

The SIMD paradigm is one in which multiple threads perform the same instruction in parallel. If different lanes need to perform different instructions (e.g., by evaluating the condition of a conditional branch differently), then control flow divergence occurs. Each different control flow path is executed, but in a serial, rather than parallel manner. That is, lanes taking one control flow path execute and then lanes taking a different control flow path execute. A higher degree of divergence means a greater number of serialized control flow paths due to a greater number of lanes executing different control flow paths, and thus a higher degree of slowdown.

As described above, the determination of whether a ray hits an object is referred to herein as a "ray-intersection test." The ray-intersection test involves casting a ray from an origin and determining whether the ray hits a triangle (a primitive) of a scene, and, if so, what distance from the origin the triangle hit is at. For efficiency, the ray-tracing test uses a representation of space referred to as a bounding volume hierarchy. This bounding volume hierarchy is the "acceleration structure" described above. In an example bounding volume hierarchy, each non-leaf node represents an axis aligned bounding box that bounds the geometry of all children of that node. In an example, the base node is associated with the maximal extents of an entire region for which the ray-intersection test is being performed. In this example, the base node has two children that each represent mutually exclusive axis aligned bounding boxes that subdivide the entire region. Each of those two children has two child nodes that represent axis aligned bounding boxes that subdivide the space of their parents, and so on. Leaf nodes represent a triangle against which a ray test can be performed.

The bounding volume hierarchy data structure allows the number of ray-triangle intersections (which are complex and thus expensive in terms of processing resources) to be reduced as compared with a scenario in which no such data structure is used and therefore all triangles in a scene would have to be tested against the ray. Specifically, if a ray does not intersect a particular bounding box, and that bounding box bounds a large number of triangles, then all triangles in that box can be eliminated from the test. Thus, a ray-intersection test is performed as a sequence of tests of the ray against bounding boxes, followed by tests against triangles.

Figure 6:
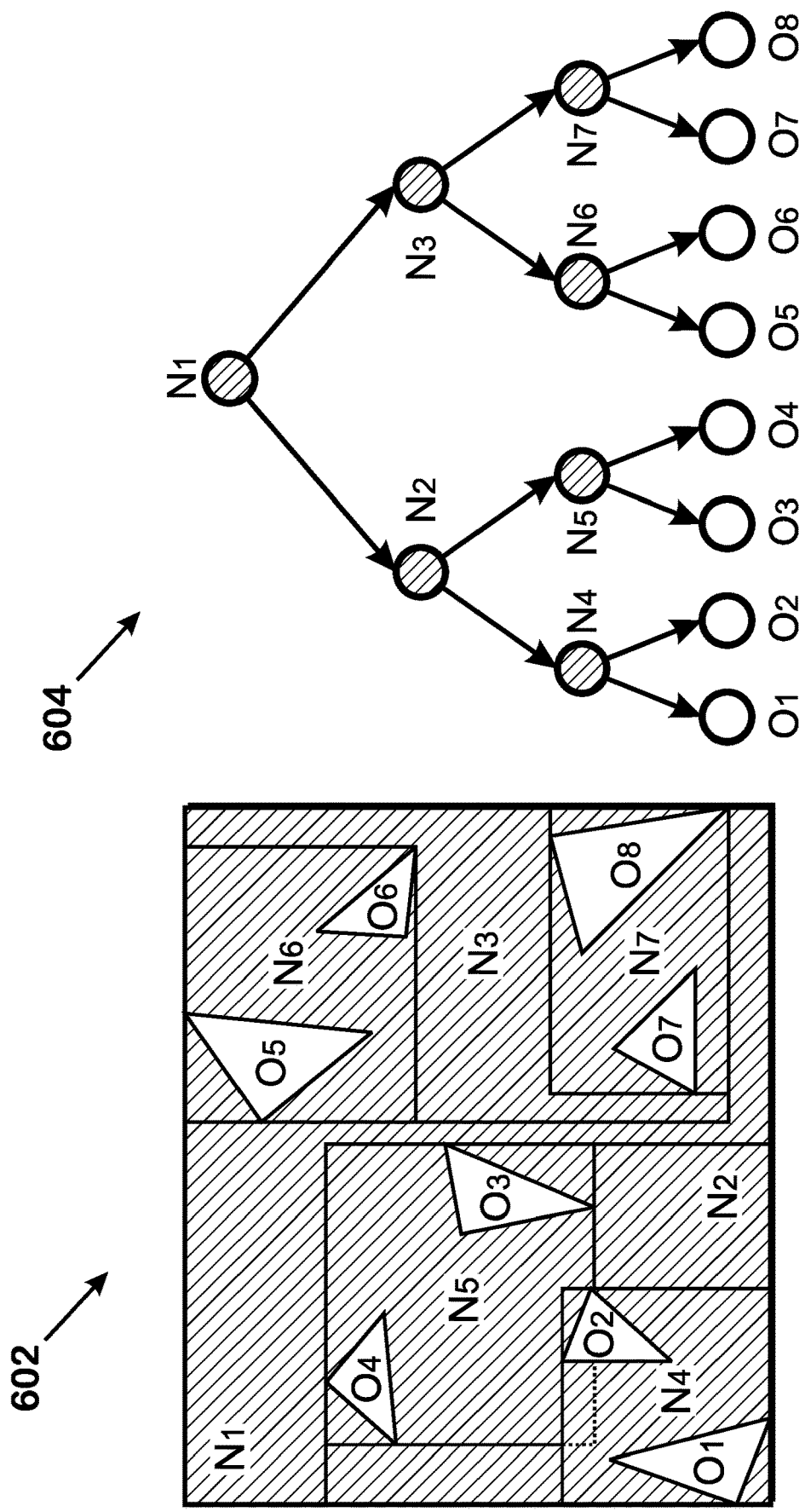
FIG. 6 illustrates a bounding volume hierarchy, according to an example.

FIG. 6 is an illustration of a bounding volume hierarchy, according to an example. For simplicity, the hierarchy is shown in 2D. However, extension to 3D is simple, and it should be understood that the tests described herein would generally be performed in three dimensions.

The spatial representation 602 of the bounding volume hierarchy is illustrated in the left side of FIG. 6 and the tree representation 604 of the bounding volume hierarchy is illustrated in the right side of FIG. 6. The non-leaf nodes are represented with the letter "N" (which represent 3D regions of the scene volume) and the leaf nodes (which represent 3D primitives in the scene) are represented with the letter "O" in both the spatial representation 602 and the tree representation 604. A ray-intersection test would be performed by traversing through the tree 604, and, for each non-leaf node tested, eliminating branches below that node if the box test for that non-leaf node fails. For leaf nodes that are not eliminated, a ray-triangle-intersection test is performed to determine whether the ray intersects the triangle at that leaf node. For non-leaf nodes that are not eliminated, the ray-intersection test would intersect the ray with such non-eliminated nodes, to determine whether children of such nodes should be eliminated from consideration. For leaf nodes or non-leaf nodes that are eliminated, the ray-intersection test does not perform an intersection test of the ray with such nodes. In sum, to perform an intersection test for a ray, the ray-tracing pipeline 400 begins with one or more starting non-leaf nodes and tests one or more of those non-leaf nodes for intersection with the ray. The ray-tracing pipeline 400 follows the edges of the bounding volume hierarchy, testing non-leaf nodes against the ray to either eliminate or not eliminate children of those nodes. For leaf nodes encountered by the ray-tracing pipeline 400, the ray-tracing pipeline 400 tests the ray against such nodes to determine whether the ray intersects the geometry associated with such leaf nodes.

In an example, the ray intersects $O_5$ but no other triangle. The test would test against $N_1$, determining that this test succeeds. The test would test against $N_2$, determining that the test fails. The test would eliminate all sub-nodes of $N_2$ and would test against $N_3$, noting that that test succeeds. The test would test $N_6$ and $N_7$, noting that $N_6$ succeeds but $N_7$ fails. The test would test $O_5$ and $O_6$, noting that $O_5$ succeeds but $O_6$ fails. Instead of testing eight triangle tests, two triangle tests ($O_5$ and $O_6$) and five box tests ($N_1$, $N_2$, $N_3$, $N_6$, and $N_7$) are performed.

As described herein, non-leaf nodes are associated with bounding boxes that bound the geometry of the children of those non-leaf nodes. Leaf nodes are associated with geometry of the scene against which rays are tested. A variety of geometry types may exist. Some example geometry types for leaf nodes are triangles and procedural geometry, although this is not an exhaustive list. Procedural geometry is geometry whose intersection with a ray is defined procedurally, rather than as data. More specifically, procedural geometry is associated with leaf nodes, and represents the geometry that a ray is tested against to determine whether a ray hits the geometry of such leaf nodes. In the process of traversing a bounding volume hierarchy, in response to the ray-tracing pipeline 400 encountering a leaf node that has associated procedural geometry, the ray-tracing pipeline 400 triggers execution of a procedure, such as one specified in a shader program (or through other means), to determine whether the ray intersects that procedural geometry. Thus, the test for intersection with procedural geometry is defined procedurally.

As described in FIG. 5, multiple lanes of a SIMD unit 238 perform operations in parallel. In some examples, a bounding volume hierarchy traversal ("BVH traversal") shader program executes as part of the acceleration structure traversal stage 404. The BVH traversal shader program traverses the BVH 604, moving between different box nodes and triangle nodes depending on the result of ray intersection tests with the nodes as described elsewhere herein. The BVH traversal shader program also invokes shader programs for the stages of the ray tracing pipeline 400, such as the any hit shader 406, closest hit shader 410, or miss shader 412.

The BVH traversal shader program executes in a SIMD manner. Thus, multiple lanes in a SIMD unit 328 execute the BVH traversal shader program in parallel. Shader programs include multiple work-items, each of which executes on a different lane. Lanes are hardware circuitry for executing work-items, and work-items are software entities that execute concurrent as part of a wavefront.

Each work-item of the BVH traversal shader program traverses through a bounding volume hierarchy in a potentially different way. More specifically, as described above, colors for different pixels are determined by casting different rays into a scene, where each different ray intersects with different pixels 106. These different rays can be processed in parallel by different work-items of a wavefront executing in a SIMD unit 238. As described above, execution divergence can occur when different work-items execute different control flow paths. In the case of a BVH traversal shader, some work-items may terminate traversal of the BVH earlier than other work-items. In an example, a work-item identifies an any hit and causes an any hit shader to execute while other rays are still traversing the BVH. If a work-item terminates traversal while other work-items are still executing, then the lane for that work-item becomes idle, and the utilization of processing resources (e.g., resources of the SIMD unit 238) decreases. Techniques are presented herein to improve hardware utilization for BVH traversal of the BVH by causing work-items that have terminated traversal of the BVH to assist other lanes that are still traversing the BVH.

Although described as a shader program in one example, in another example, the entity that traverses the BVH is a fixed function hardware entity. While this fixed function hardware entity does not have execution lanes that execute wavefronts, the fixed function hardware entity does have multiple hardware BVH traversal elements that can operate in parallel in a somewhat similar manner as with a SIMD unit 138 executing a wavefront. As with a SIMD unit 138/wavefront, when traversals through the BVH terminate in the hardware traversal entity, efficiency for that hardware entity is lost, as at least some of these hardware traversal entities become idle. Herein, where a BVH traversal shader program is described, it should be understood that this could be substituted with a fixed function hardware traversal entity. In some examples, a lane of a SIMD unit 138 corresponds to a "slot" of the hardware traversal entity. In some examples, the term "execution item" used herein refers to a work-item or a slot of a hardware traversal entity.

Figure 7:
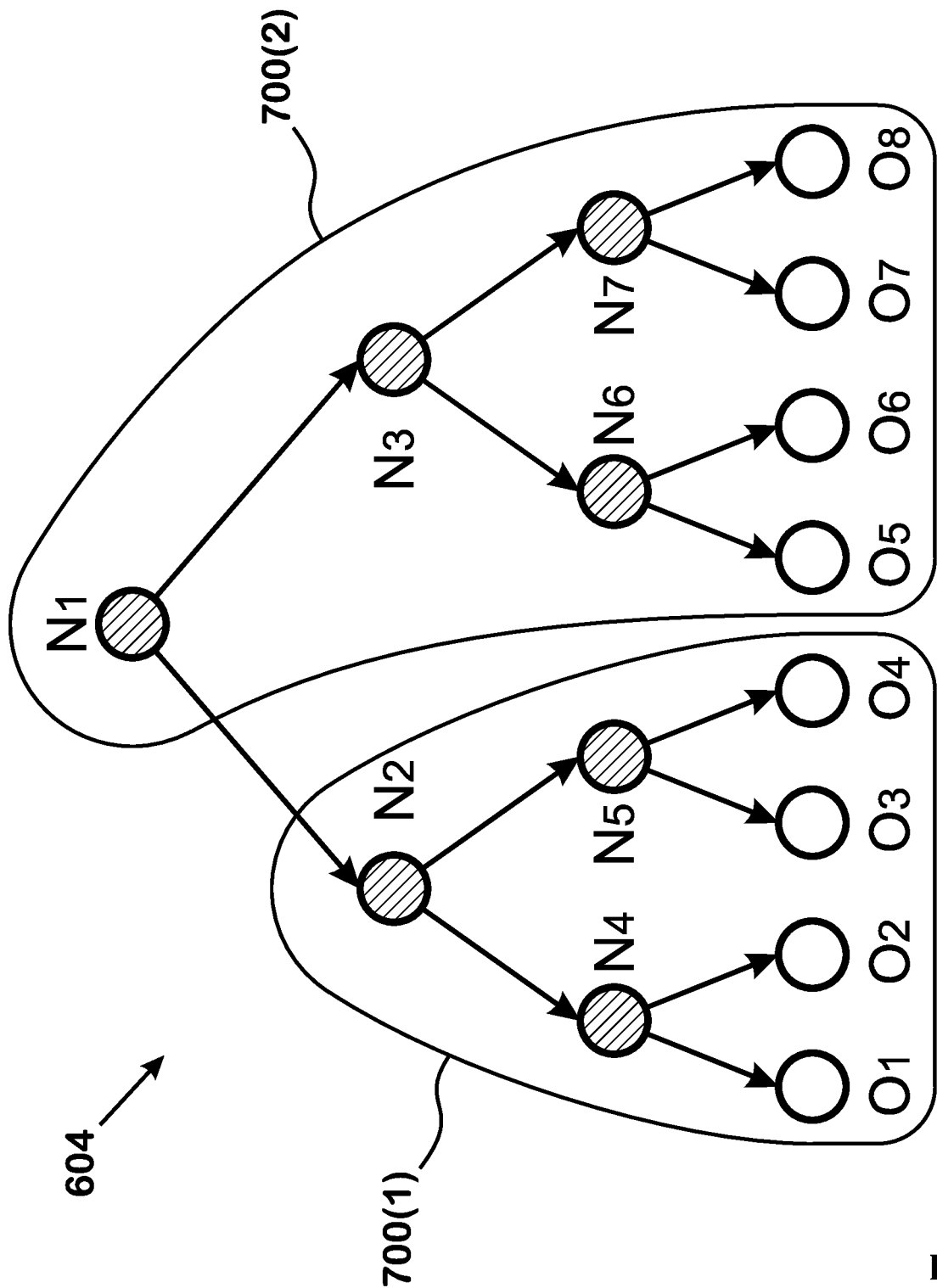
FIG. 7 illustrates the bounding volume hierarchy of FIG. 6 divided into regions, according to an example.

Referring to FIG. 7, described is a technique for utilizing an execution item that would otherwise be idle to assist another execution item with traversing a bounding volume hierarchy. In general, the technique includes, in response to detecting that one or more execution items are idle, dividing the BVH, which is being traversed by at least one execution item, into multiple regions 700, and assigning each region 700 to a different execution item. A execution item may become idle when that execution item has terminated traversing the BVH for its assigned ray. Once that execution item has terminated such traversal, the execution item is idle and available to assist another execution item with a different ray, by traversing a region 700 of the BVH for that ray. In an example, a execution item already traversing the BVH is assigned one of those regions 700 (and thus the portion of that BVH assigned to be traversed by that execution item is reduced) and one or more idle execution items are assigned another one of those regions 700.

The parallelization of traversal through the BVH has the potential to cause execution to behave in a way that is incorrect. More specifically, the entity that requests the ray tracing pipeline 400 to perform ray tracing operations expects certain aspects of those operations to occur in a certain order. Put differently, the ray tracing application programming interface provides guarantees to the client of that interface (e.g., a software application) that certain actions referred to herein as "side effects" occur in a consistent order across frames. Put differently, this guarantee is that regardless of how the hardware actually operates, the order in which such side effects occur will be the same. Stated in yet another way, this guarantee is one that if the same ray were traced against the same BVH, the same side effects would occur in the same order, even if the hardware actually performed such ray tracing in a different manner. For example, with parallel traversal of the same BVH for the same ray, but with different portions of the BVH traversed by different execution items, the side-effects would be performed in the same order regardless of the order in which the different execution items test the nodes assigned to those execution items. In a different example, stated in still another way, this guarantee is one that, if the same scene (represented by the same BVH) were evaluated using the same rays over multiple frames, then in each frame, the side effects would occur in the same order.

A "side effect" is one of the following. A shader execution is a side effect. Also, an indication, to a BVH traversal shader program, from a hardware intersection unit that tests nodes for intersection with rays, that a potential hit has occurred, is a side effect. A potential hit is an indication that a hit may occur with a primitive (e.g., a triangle or procedural geometry), and it is possible that a potential hit is rejected as a true hit by the BVH traversal shader program. More specifically, the hardware intersection unit indicates whether a ray intersects with the geometry of a triangle, and indicates to the BVH traversal shader program the result of this test. The BVH traversal shader program or a different shader program can then evaluate that result to determine whether to treat the reported hit as an actual hit or not. In an example, where a potential hit is reported for a ray, a shader program determines that the potential hit actually hits a sufficiently transparent portion of a primitive and thus should not be counted as an actual hit. This evaluation of potential hits is, itself, a side-effect. Thus, the side-effects include, for leaf nodes, execution of a shader program as a result of a determination that a ray intersects a leaf node, or an evaluation of a potential hit as an actual hit or a rejected hit. Side effects occur for leaf nodes (O in FIG. 8) but not for non-leaf nodes. It is also possible for procedural geometry to be specified by leaf nodes. In such instances, a potential hit serves as a notification to a procedural geometry shader that determines whether a hit or a miss occurs.

In the technique described herein, ensuring side-effect order occurs in the following manner. Each execution item that is processing the same ray has a place in a side effect order. The place defines the order of execution of side-effects for the execution items. Side effects for execution items that are later in the order are not executed until side effects for execution items that are earlier in the order are executed. To enforce this ordering, each execution item cooperating on the same ray performs operations that do not generate side-effects in parallel, in any technically feasible order. If an execution item later in the order would generate a side-effect, and an execution item earlier in the order has not yet generated all of its side-effects, then the execution item later in the order waits to generate its side-effects until all execution items earlier in the order have generated their side-effects. While side-effects may be at least partially serialized with this technique, at least some of the traversal through the BVH is performed in parallel, which reduces the overall traversal time of the BVH.

In some examples, the above-described order is defined by the order of the leaf nodes in the BVH. More specifically, each portion of the BVH provided to a particular execution item includes leaf nodes that are at a particular place in an overall order of leaf nodes. In an example, such order is from left to right in the BVH tree. Any other technically feasible means for assigning an order for performing side-effects is possible, such as from right to left in the BVH, or in any other technically feasible order.

Example instances of parallel traversal through a BVH 604 are now described with reference to FIGS. 7 and 8.

FIG. 7 illustrates a bounding volume hierarchy 604 divided into regions 700(1) and 700(2), according to an example. To illustrate the technique referred to above, assume that execution item 0 determines that ray 0 intersects node $N_1$. Further assume that after execution item 0 makes this determination, execution item 1 finishes traversing the bounding volume hierarchy for ray 1.

To speed up the traversing of the bounding volume hierarchy for ray 0, the accelerated processing device 216 causes execution item 1 to traverse the bounding volume hierarchy 604 for the ray 0 concurrently with execution item 0. For example, the device APD 216 assigns execution item 1 the region 700(1) of the bounding volume hierarchy 604 and assigns the execution item 0 the region 700(2). In some examples, the regions 700 are non-overlapping—no one node can exist in more than one region 700.

Subsequently, execution item 1 determines whether ray 0 intersects the node $N_2$ concurrently with the execution item 0 determining whether ray 0 intersects the node $N_3$. In an example, execution item 1 determines that ray 0 does not intersect the node $N_2$. If execution item 0 thereafter determines that ray 0 intersects the primitive $O_5$, then the device 200 allows execution item 0 to initiate a side-effect for the primitive $O_5$ because execution item 1 will not thereafter initiate any side-effects for any of primitives $O_1$-$O_4$.

In another example, the traversal sequence is as follows. execution item 1 determines that ray 0 intersects node $N_2$, and execution item 0 determines that ray 0 intersects node $N_3$. Next, execution item 1 determines that ray 0 does not intersect node $N_4$, and execution item 0 determines that ray 0 intersects node $N_6$. Then, execution item 1 determines that ray 0 intersects the node $N_5$, and execution item 0 determines that ray 0 intersects primitive $O_5$.

If execution item 0 were to initiate a side-effect in response to detecting the intersection of Ray_0 with the primitive $O_5$, then execution item 0 runs the risk of initiating a side-effect for $O_5$ before execution item 1 has a chance to initiate any side-effects for primitives $O_3$ and $O_4$. That is, if execution item 0 were to initiate a side-effect in response to determining that ray 0 intersects primitive $O_5$ before execution item 1 were to initiate one or more side-effects for primitives $O_3$ and $O_4$, this would constitute an out-of-order initiation of a side-effect.

To prevent an out-of-order initiation of a side effect, execution item 0 waits for execution item 1 to finish traversing the region 700(1) of the bounding volume hierarchy for ray 0 before initiating a side-effect in response to ray 0 intersecting the primitive $O_5$.

By waiting for a first execution item to finish traversing, for a ray, a region of the bounding volume hierarchy that comes before (in the order indicated by the bounding volume hierarchy) a region being traversed by a second execution item for the same ray before the second execution item initiates a side effect, the side-effect-initiation order is preserved. For example, as long as execution item 0, which traverses the region 700(2) for ray 0, waits to initiate a side-effect until execution item 1 is finished traversing the region 700(1) for ray 0, the side-effect-initiation order is preserved.

Regarding the order indicated by the bounding volume hierarchy, in some examples, this order is a defined depth first traversal order whereby whenever multiple possible paths exist, those multiple possible paths will be visited in an order which will be repeatable if the same ray is cast into the same BVH again. The ordering of children of a node for which hits occur can be sorted by hardware to improve performance. For example, when running shadow rays, performance boost can be gained by intersecting the largest of the children first followed by the second largest child, and so on. In other techniques, these children can be sorted in order of most to least overlap with the ray. In such examples, this order is determined after intersection, but is repeatable for a given ray and BVH, so even though the order is determined at traversal time, the order is consistent across multiple traversals with the same ray on the same BVH. The order with which side effects are resolved is not necessarily determined based on spatial factors, but is consistent across traversals with the same ray and same BVH.

Figure 8:
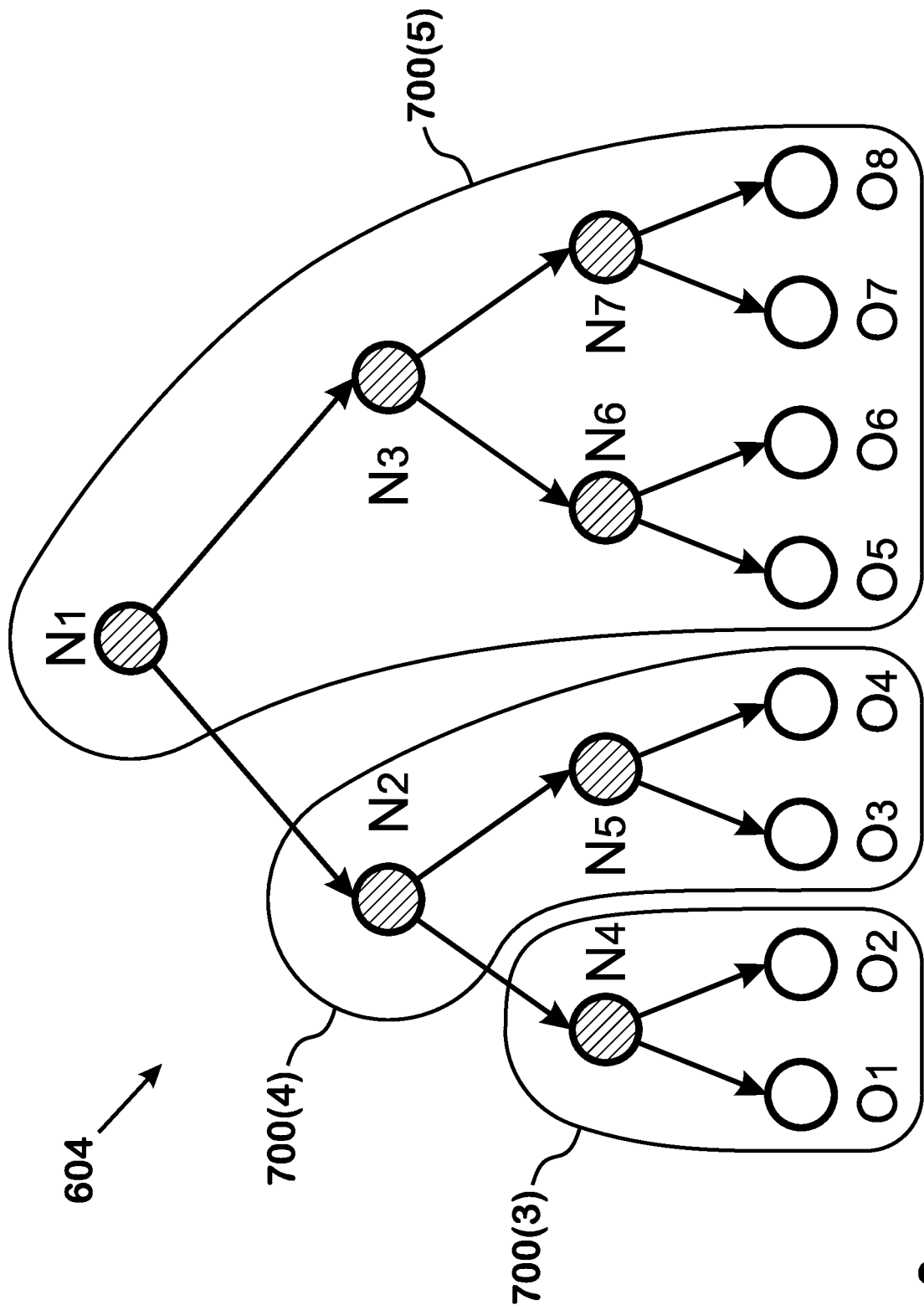
FIG. 8 illustrates the bounding volume hierarchy of FIGS. 6 and 7 divided into regions, according to another example.

FIG. 8 illustrates a bounding volume hierarchy 604 divided into three regions 700(3), 700(4), and 700(5) according to an example.

In an example, execution item 0 traverses the region 700(3) for a ray 0, execution item 1 traverses the region 700(4) for the ray 0, and execution item 2 traverses the region 700(5) for the ray 0.

To prevent an out-of-order initiation of a side effect (i.e., to preserve the order in which work-items initiate side-effects), execution item 1 waits for execution item 0 to finish traversing the region 700(3) of the bounding volume hierarchy for the ray 0 before initiating a side-effect in response to ray 0 intersecting (or missing) one or both primitives $O_3$ and $O_4$, and the execution item 2 waits for both execution item 1 and execution item 0 to finish traversing the regions 700(3) and 700(4) before initiating a side-effect in response to ray 0 intersecting (or missing) one or more of the primitives $O_5$-$O_8$.

Figure 9:
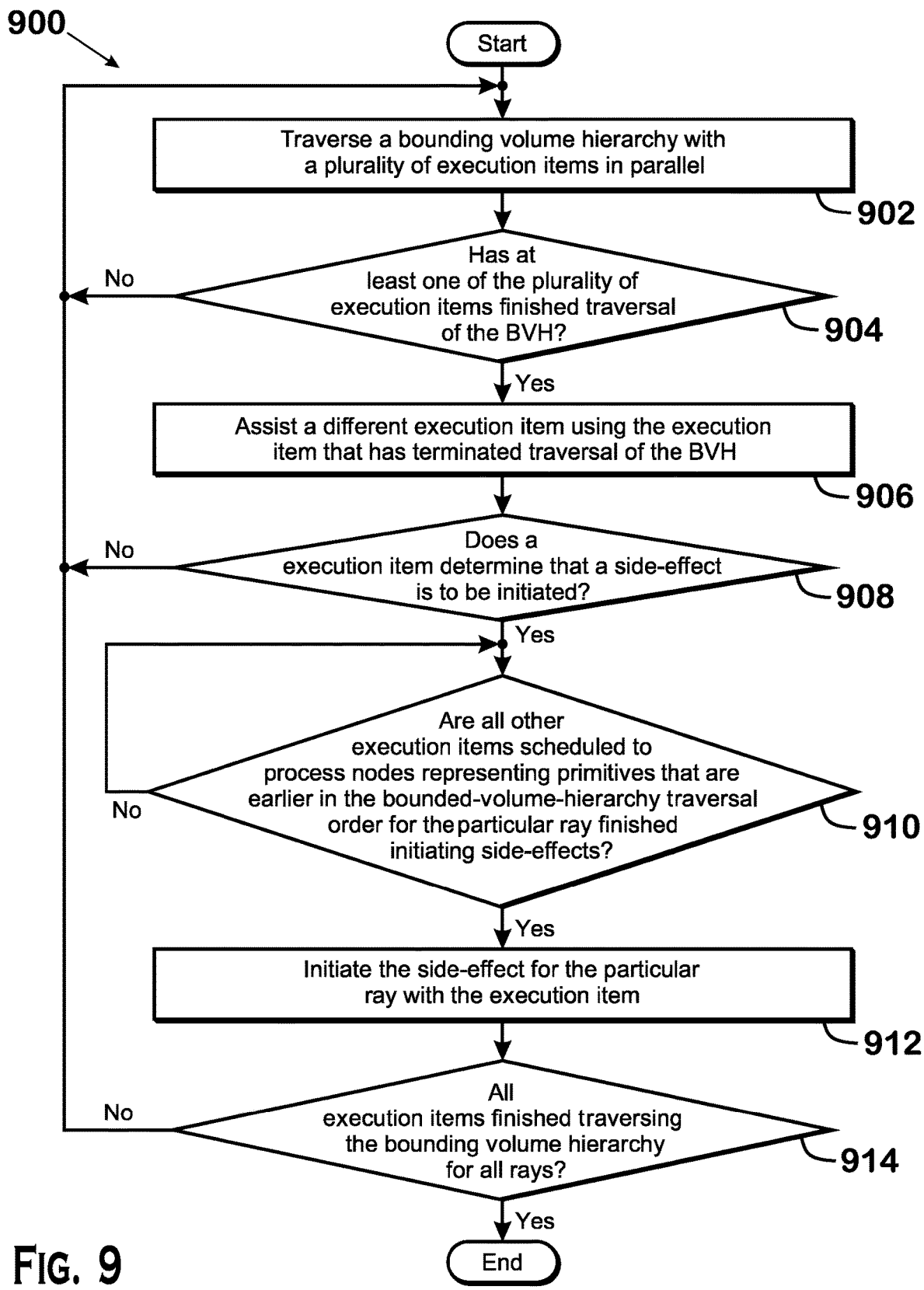
FIG. 9 is a flow diagram of a method for traversing multiple regions of a bounding volume hierarchy for a ray in parallel, according to an example.

FIG. 9 is a flow diagram 900 of a method for traversing multiple regions of a bounding volume hierarchy for a ray in parallel, according to an example. Although described with respect to the system of FIGS. 1-8, those of skill in the art will understand that any technically feasible system configured to perform the steps of the method 900 in any technically feasible order falls within the scope of the present disclosure.

At step 902, a plurality of execution items traverse a bounding volume hierarchy for a plurality of rays in parallel.

At step 904, the APD 216 determines whether at least one of the plurality of execution items has finished traversal of the BVH. If the APD 216 determines that none of the execution items has finished traversing the BVH, then the APD 216 returns to step 902. If the APD 216 determines that at least one of the execution items has finished traversing the bounding volume hierarchy, then the APD 216 proceeds to step 906.

At step 906, the APD 216 causes the execution item that has terminated traversal of the BVH to assist a different execution item with traversal of the BVH for the ray assigned to that different execution item.

At step 908, the APD 216 determines whether a execution item of the plurality of execution items has newly determined that a side-effect is to be initiated. If the APD 216 determines that no execution item has newly determined that a side-effect is to be initiated, then the APD 216 returns to step 902. If the APD 216 determines that at least one execution item has newly determined that a side-effect is to be initiated, then the device proceeds to step 910.

At step 910, the APD 216 determines whether all execution items scheduled to process leaf nodes that are earlier in the bounded-volume-hierarchy traversal order than the subject execution item are finished processing the earlier leaf nodes. That is, the APD 216 determines whether any of the other execution items scheduled to process the nodes representing primitives that are earlier in the bounding-volume-hierarchy traversal order for the particular ray could still initiate side-effects. If the APD 216 determines that at least one of the other execution items traversing regions of the bounding volume hierarchy earlier in the traversal order for the particular ray could still initiate a side-effect, then the device stalls the at least one execution item from initiating the side-effect, effectively repeating step 910. But if the device 200 determines that none of the other execution items traversing regions of the bounding volume hierarchy earlier in the traversal order for the particular ray could still initiate a side-effect, then the device proceeds to a step 912.

At step 912, the device 200 allows the at least one execution item to initiate the side-effect, and the device 200 then proceeds to step 914. At step 914, the device 200 determines whether all of the execution items have finished traversing the bounding volume hierarchy for all of the rays. If the device 200 determines that not all of the execution items have finished traversing the bounding volume hierarchy for at least one ray of the plurality of rays, then the device 200 returns to the step 904. But if device 200 determines that all of the execution items have finished traversing the bounding volume hierarchy for all of the rays, the device ends the method represented by the flow diagram 900.

Figure 10:
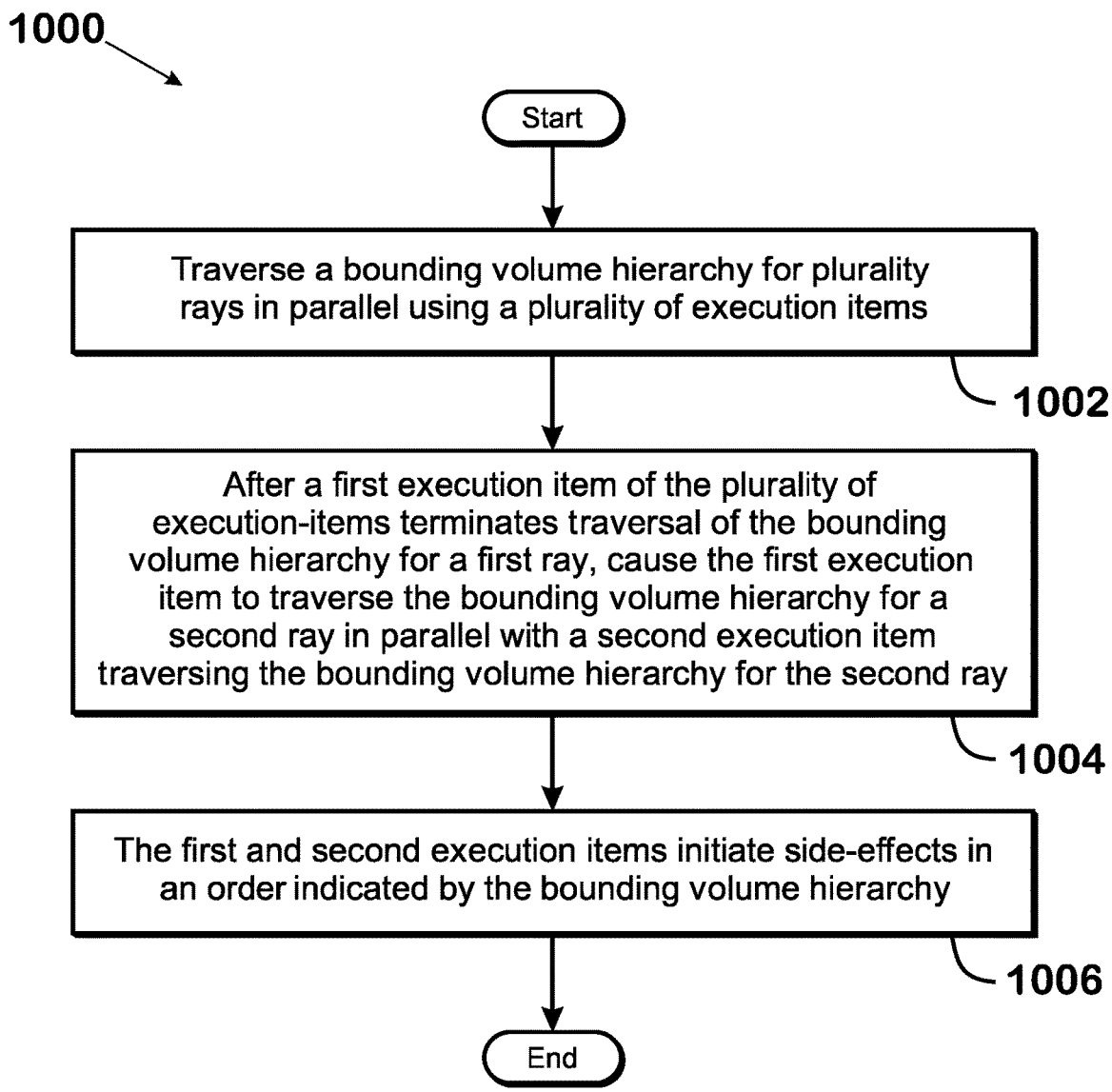
FIG. 10 is a flow diagram of a method for traversing multiple regions of a bounding volume hierarchy for a ray in parallel, according to another example.

FIG. 10 is a flow diagram 1000 of a method for traversing multiple regions of a bounding volume hierarchy for a ray in parallel, according to another example. The method represented by the flow diagram 900 of FIG. 9 is an example implementation of the method represented by the flow diagram 1000. Although described with respect to the system of FIGS. 1-8, those of skill in the art will understand that any technically feasible system configured to perform the steps of the method 1000 in any technically feasible order falls within the scope of the present disclosure.

At step 1002, the APD 216 causes execution items to traverse a bounding volume hierarchy for a plurality of rays in parallel. The execution items are part of the same wavefront. At step 1004, after the APD 216 determines that a first execution item of the plurality of execution items terminates traversal of the bounding volume hierarch for a first ray of a plurality of rays, the device causes the first execution item to traverse the bounding volume hierarchy for a second ray of the plurality of rays while a second execution item of the plurality of execution items also traverses the bounding volume hierarchy for the second ray.

At step 1006, the APD 216 causes the first and second execution items to initiate side-effects in an order indicated by the bounding volume hierarchy. For example, if the second execution item traverses, for the second ray, a first region of the bounding volume hierarchy that comes before a second region of the bounding volume hierarchy that the first execution item traverses for the second ray, then the first execution item waits for the second execution item to initiate all side-effects corresponding to the first region of the bounding volume hierarchy before initiating any side-effects corresponding to the second region of the bounding volume hierarchy.

Instance BVHs present a difficulty for the technique described above in that where multiple execution items are traversing the same instance BVH, state associated with such traversal cannot necessarily be freed when a single execution item stops traversing that instance BVH. Instead, freeing such state should wait until all execution items stop traversing the instance BVH. In some examples, the state includes a transformed ray that is stored during traversal of the instance BVH but not outside of that time period. If multiple execution items are traversing the instance BVH and thus utilizing this transformed ray, then this ray can only be freed once all execution items have terminated traversal of the instance BVH. Additional details follow.

Figure 11:
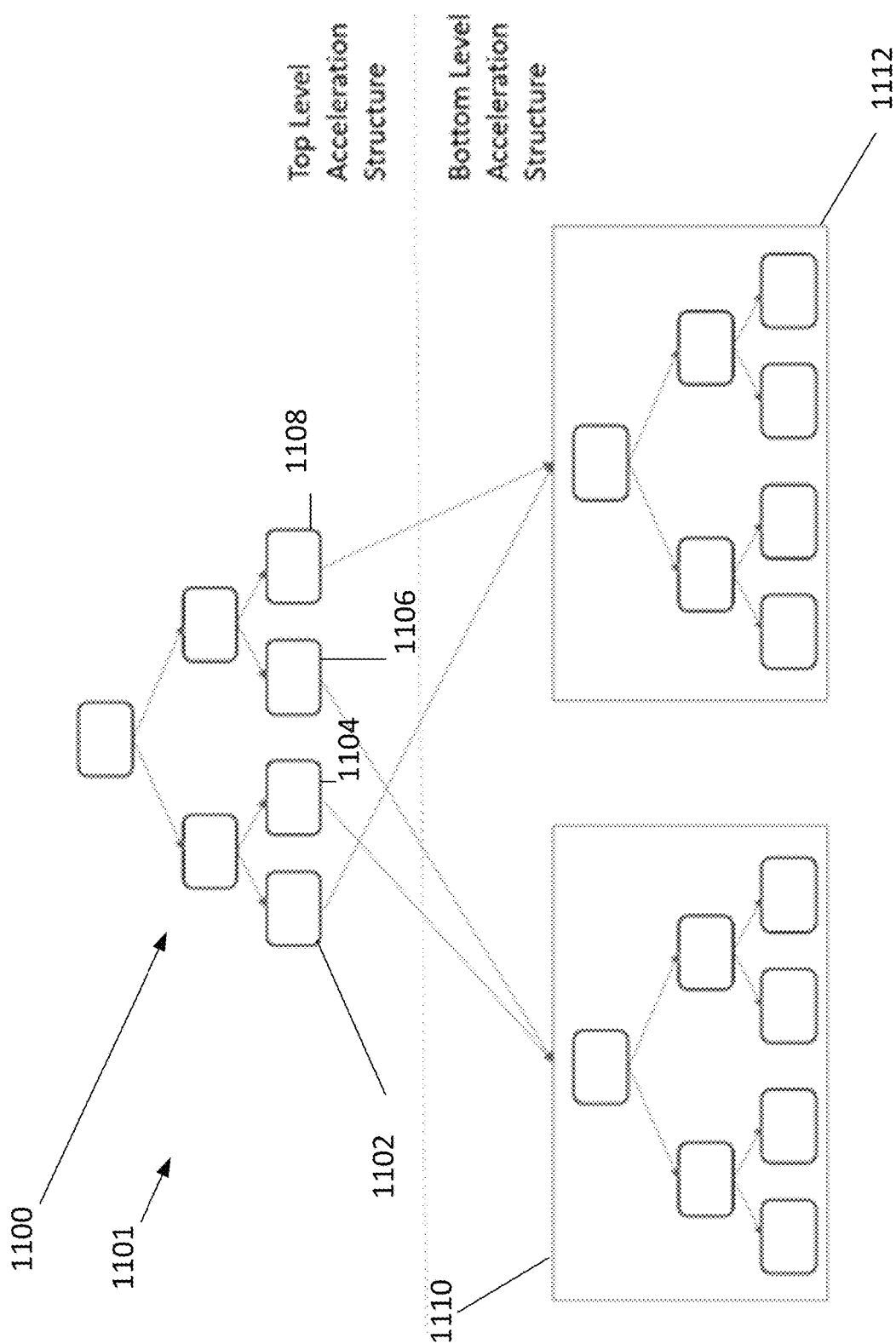
FIG. 11 illustrates a bounding volume hierarchy having instance nodes and traversing multiple regions of an instance node for a transformed ray in parallel, according to an example.

FIG. 11 is a diagram of a bounding volume hierarchy 1100 including instance nodes 1102, 1104, 1106, and 1108, an instance BVH 1110, and an instance BVH 1112, according to an example. For purposes of example, the bounding-volume-hierarchy model 1110 is described below. It should be understood that a description of the bounding-volume-hierarchy model 1112 is similar.

The bounding-volume-hierarchy model 1110 is a bottom level bounding volume hierarchy. A top level BVH 1101 includes one or more non-leaf nodes and one or more instance nodes 1102. Each instance node 1102 points to a bottom level BVH 1110. Each instance node 1102 also includes a transform that indicates how the geometry of the pointed-to bottom level BVH 1110 is transformed when traversing the bottom level BVH 1110. More specifically, the bottom level BVHs 1110 represent geometry that can be reused throughout a scene while not requiring the data of such geometry to be copied. For example by pointing to the same bottom level BVH 1110 with different instance nodes 1102, the geometry of the bottom level BVH 1110 can be reused through a scene. A ray transformation specifies geometrical transformations applied to such bottom level BVHs 1110 in order to provide some variation for the associated geometry. Transforms can specify positional, scale, rotational, or other transformations. Thus, a single bottom level BVH 1110 along with a plurality of instance nodes 1102 allows for efficient representation of similar geometry with different parameters (e.g., position, rotation, scale).

An execution item traverses a BVH that includes instance nodes by traversing to an instance node 1102 for a ray, performing a transform as specified by the instance node 1102 on the ray to generate a transformed ray, and then traversing to the pointed-to bottom level BVH 1110, using the transformed ray. While traversing the bottom-level BVH 1110, the APD 216 stores the coordinates of the transformed ray in a storage such as a local memory of the compute unit 232 or APD 216, at least for the period of time during which one or more execution items of the plurality of execution items traverses the bottom level BVH 1110 for the transformed ray.

One or more of the execution items traverse the bottom level BVH 1110 for a transformed ray in a manner similar to the manner in which one or more execution items traverse a bounding volume hierarchy for a ray as described above in conjunction with FIGS. 7-10. More specifically, it is possible that while a first execution item traverses a bottom level BVH 1110, a second execution item terminates traversal of the BVH 1100 and thus becomes available to assist the first execution item with such traversal of the bottom level BVH 1110.

After all execution items traversing the bottom-level bounding-volume-hierarchy 1110 finish their traversals for the same transformed ray, the APD 216 releases the portion of the memory storing the coordinates of the shifted ray so that this portion of the memory can be used for another purpose.

Multiple execution items traversing a bounding-volume-hierarchy model for a shifted ray initiate side-effects in an order indicated by the bounding-volume-hierarchy model 1110 in a manner similar to that described above in conjunction with FIGS. 7-8. Therefore, the execution items that cooperate to traverse a bottom-level BVH 1110 for the same transformed ray determine whether to release the transformed ray in the following manner. If an execution item terminates traversing the bottom-level BVH 1110, the execution item checks whether there is at least one execution item traversing the bottom-level BVH 1110 for the transformed ray. If such an execution item exists, then the execution item does not free the transformed ray, as that ray is still being used. In some examples, an execution item checks whether there is at least one such other execution item by checking whether there is at least a execution item still traversing the bottom-level BVH 1110 with the same transformed ray, where that execution item is immediately preceding or subsequent to the execution item that is terminating. More specifically, in an implementation, a linked list stores an indication of each execution item traversing a bottom-level BVH 1110. Each element is associated with a subject execution item and stores a pointer to the execution item that is immediately prior to the subject execution item in the traversal order, if such execution item exists, and to the execution item that is immediately subsequent to the subject execution item in the traversal order, if such execution item exists. When an execution item terminates traversal of the bottom-level BVH 1110, the execution item checks the corresponding element of the linked list. If that element has a valid pointer in either direction, then the execution item does not free the transformed ray and if the element does not have such a valid pointer, then no execution item requires the transformed ray and the execution item frees the transformed ray.

Figure 12:
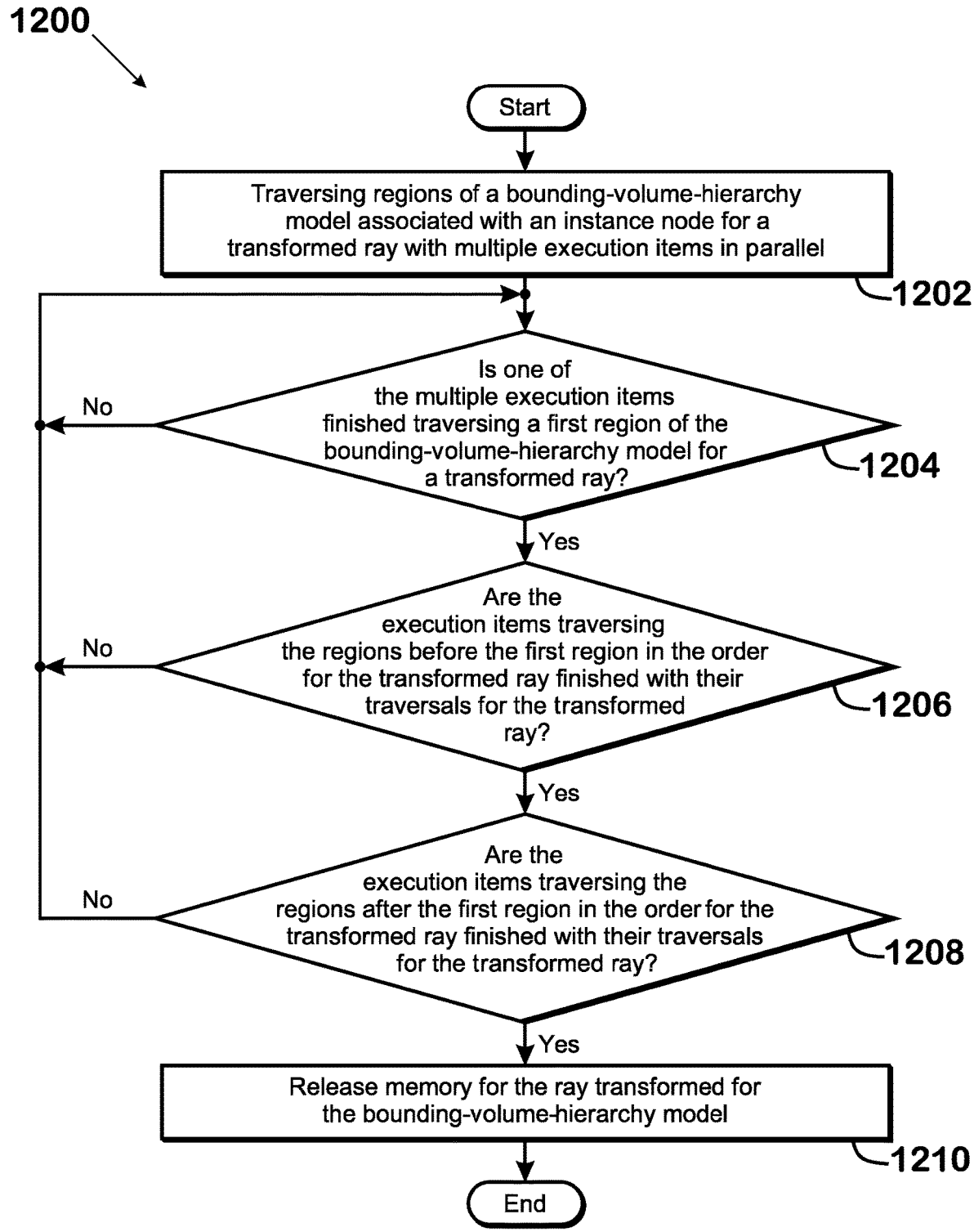
FIG. 12 illustrates a method for traversing a BVH, according to an example.

FIG. 12 is a flow diagram of a method 1200, according to an example. Although described with respect to the system of FIGS. 1-11, those of skill in the art will understand that any system configured to perform the steps of the method 1200 in any technically feasible order falls within the scope of the present disclosure.

At step 1202, execution items traverse regions of a BVH model associated with an instance node for a transformed ray in parallel. At step 1204, one of the execution items determines whether it is finished traversing a first region. If not, the method 1200 returns to step 1204 and if the execution item is finished, then the method 1200 proceeds to step 1206. At step 1206, execution items determine whether execution items before the first region are finished traversing their regions. If so, then the method proceeds to step 1208 and if not, then the method returns to step 1204. At step 1208, the execution items determine whether the execution items after the first region are finished executing their regions. If so, then the method proceeds to step 1210 and if not, then the method returns to step 1204. At step 1210, the work-item releases memory for the ray being used for the BVH model.

Each of the units illustrated in the figures represent hardware circuitry configured to perform the operations described herein, software configured to perform the operations described herein, or a combination of software and hardware configured to perform the steps described herein. For example, the acceleration-structure-traversal stage 404 is implemented fully in hardware, fully in software executing on processing units (such as compute units 232 of the collection of compute units 302), or as a combination thereof. In some examples, the acceleration-structure-traversal stage 404 is partially implemented as hardware and partially as software. In some examples, the portion of the acceleration-structure-traversal stage 304 that traverses the bounding volume hierarchy is software executing on a processor and the portion of the acceleration-structure-traversal stage 404 that performs the ray-box intersection tests and ray-triangle intersection tests is implemented in hardware. In addition, any of the stages of the ray-tracing pipeline 400 are, in various implementations, implemented as hardware circuitry, software executing on a processor, or a combination thereof. In addition, any of the units of FIG. 2 or 3 are, in various implementations, implemented as hardware circuitry, software executing on a processor, or a combination thereof. Where a particular stage of the ray-tracing pipeline 400 is said to be "invoked," this invocation involves performing the functionality of the hardware if the stage is implemented as hardware circuitry or executing a shader program (or other software) if the stage is implemented as a shader program that executes on a processor. The illustrated elements of the APD 316 in FIG. 3 (e.g., the scheduler 236, graphics processing pipeline 234, compute units 232, and SIMD units 236) represent hardware elements such as hardware circuitry. The acceleration structure traversal stage 404 illustrates hardware (e.g., circuitry), software (e.g., shader programs) or a combination thereof. The acceleration structure 602 represents data in memory.

It is understood that many variations are possible based on the disclosure herein. Although features and elements are described above in particular combinations, each feature or element can be used alone without the other features and elements or in various combinations with or without other features and elements.

The various functional units illustrated in the figures and/or described herein (including, but not limited to, the processor 202, the storage 206, the output driver 214, the APD 216, the output devices 210, the display device 218, the memory 204, the input driver 212, the input devices 208, the scheduler 236, the graphics processing pipeline 234, the compute units 232, the SIMD units 238, and the ray tracing pipeline 400 (including each stage thereof)), may be implemented as a general purpose computer, a processor, a processor core, fixed function circuitry, as a program, software, or firmware, stored in a non-transitory computer readable medium or in another medium, executable by a general purpose computer, a processor, or a processor core, or as a combination of software executing on a processor and fixed function circuitry. The methods provided can be implemented in a general-purpose computer, a processor, or a processor core. Suitable processors include, by way of example, a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be mask works that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general-purpose computer or a processor. Examples of non-transitory computer-readable storage mediums include a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method, comprising:
    traversing a bounding volume hierarchy for each ray of a plurality of rays concurrently using a plurality of execution items;
    in response to determining that a first execution item of the plurality of execution items is finished traversing the bounding volume hierarchy for a first ray of the plurality rays, causing the first execution item to traverse the bounding volume hierarchy for a second ray of the plurality of rays while a second execution item of the plurality of execution items traverses the bounding volume hierarchy for the second ray; and
    initiating side-effects with the first and second execution items in an order indicated by the bounding volume hierarchy.

2. The method of claim 1 wherein traversing the bounding volume hierarchy includes determining, for each ray, whether the ray intersects a leaf node of or a non-leaf node of the bounding volume hierarchy.

3. The method of claim 1 wherein the determining includes the first execution item determining a closest primitive within the bounding volume hierarchy that the first ray intersects, determining that the first execution item traversed the entire bounding volume hierarchy for the first one of the rays, determining that the first ray intersects at least one primitive within the bounding volume hierarchy, or that the first ray does not intersect any primitive within the bounding volume hierarchy.

4. The method of claim 1 wherein the initiating side-effects in the order includes initiating a side-effect in response to determining that each side-effect that is before the side-effect in the order has been initiated.

5. The method of claim 1 wherein the initiating side-effects in the order includes:
    determining that at least one side-effect that is before a side-effect in the order has not been initiated;

in response to the determining, waiting to initiate the side-effect.

6. The method of claim 1 wherein the order is specified by an application.

7. The method of claim 1, further comprising:
in response to determining that a third execution item of the plurality of execution items is finished traversing the bounding volume hierarchy for a third ray of the plurality of rays, causing the third execution item to traverse the bounding volume hierarchy for the second ray while the first and second execution items traverse the bounding volume hierarchy for the second ray; and
initiating side-effects with the first, second, and third execution items in the order.

8. The method of claim 1, further comprising:
traversing a plurality of regions of an instance node of the bounding volume hierarchy for a transformed ray with multiple execution items of the plurality of execution items; and
in response to a third execution item of the plurality of execution items terminating traversal of a first region of the plurality of regions, releasing memory related to the transformed ray in response to determining that the execution items corresponding to second regions of the plurality of regions on a first side of the first region terminated traversal of the second regions, and the execution items corresponding to third regions of the plurality of regions on a second side of the first region terminated traversal of the third regions.

9. The method of claim 1 wherein causing the first execution item to traverse the bounding volume hierarchy for the second ray while the second execution item traverses the bounding volume hierarchy for the second ray includes:
causing the first execution item to traverse a first region of the bounding volume hierarchy for the second ray; and
causing the second execution item to traverse a second region of the bounding volume hierarchy for the second ray while the first execution item traverses the first region of the bounding volume hierarchy for the second ray.

10. A system, comprising:
a memory circuit configured to store instructions; and
a processor circuit coupled to the memory circuit and configured to:
traverse a bounding volume hierarchy for each ray of a plurality of rays concurrently by executing a plurality of execution items;
determine whether a first execution item of the plurality of execution items is finished traversing the bounding volume hierarchy for a first ray of the plurality of rays;
in response to determining that the first execution item is finished traversing the bonding volume hierarchy for the first ray, cause the first execution item to traverse the bounding volume hierarchy for a second ray of the plurality of rays while a second execution item of the plurality of execution items traverses the bounding volume hierarchy for the second ray; and
initiate side-effects with the first and second execution items in an order indicated by the bounding volume hierarchy.

11. The system of claim 10 wherein the processing circuit is configured to traverse the bounding volume hierarchy by determining, for each ray, whether the ray intersects a non-leaf node or a leaf node of the bounding volume hierarchy.

12. The system of claim 10 wherein the processing circuit is configured to determine whether the first execution item is finished by determining a closest primitive within the bounding volume hierarchy that the first ray intersects, that the first execution item traversed the entire bounding volume hierarchy for the first one of the rays, that the first ray intersects at least one primitive within the bounding volume hierarchy, or that the first ray does not intersect any primitive within the bounding volume hierarchy.

13. The system of claim 10 wherein the processing circuit is configured to initiate side-effects by causing one of the first and second execution items to initiate a side-effect in response to the processing circuit determining that each side-effect that is before the side-effect in the order has been initiated.

14. The system of claim 10 wherein the processing circuit is configured to initiate side-effects in the order by:
determining that at least one side-effect that is before a side-effect in the order has not been initiated; and
in response to the determining, causing at least one of the first and second execution items to wait before initiating the side-effect.

15. The system of claim 10 wherein the order is specified by an application including instructions stored in the memory and which the processing circuit is configured to execute.

16. The system of claim 10 wherein the processing circuit is further configured:
in response to determining that a third execution item of the plurality of execution items is finished traversing the bounding volume hierarchy for a third ray of the plurality of rays, to cause the third execution item to traverse the bounding volume hierarchy for the second ray while the first and second execution items traverse the bounding volume hierarchy for the second ray; and
to initiate side-effects with the first, second, and third execution items in the order.

17. The system of claim 10 wherein the processing circuit is further configured to:
cause multiple execution items of the plurality of execution items to traverse a plurality of regions of an instance node of the bounding volume hierarchy for a transformed ray; and
in response to a third execution item of the plurality of execution items terminating traversal of a first region of the plurality of regions, release memory related to the transformed ray in response to determining that the execution items corresponding to second regions of the plurality of regions on a first side of the first region terminated traversal of the second regions, and the execution items corresponding to third regions of the plurality of regions on a second side of the first region terminated traversal of the third regions.

18. The system of claim 10 wherein the processing circuit is configured to cause the first execution item to traverse the bounding volume hierarchy for the second ray while the second execution item traverses the bounding volume hierarchy for the second ray by:
causing the first execution item to traverse a first region of the bounding volume hierarchy for the second ray; and
causing the second execution item to traverse a second region of the bounding volume hierarchy for the second ray while the first execution item traverses the first region of the bounding volume hierarchy for the second ray.

19. A non-transitory computer-readable medium storing instructions that, when executed by a processor, cause the processor to perform operations including:
- traversing a bounding volume hierarchy for each ray of a plurality of rays concurrently using a plurality of execution items;
- in response to determining that a first execution item of the plurality of execution items is finished traversing the bounding volume hierarchy for a first ray of the plurality rays, causing the first execution item to traverse the bounding volume hierarchy for a second ray of the plurality of rays while a second execution item of the plurality of execution items traverses the bounding volume hierarchy for the second ray; and
- initiating side-effects with the first and second execution items in a sequence indicated by the bounding volume hierarchy.

20. The non-transitory computer-readable medium of claim 19 wherein the sequence preserves determinism.

* * * * *